US012138631B2

(12) United States Patent
Chen et al.

(10) Patent No.: US 12,138,631 B2
(45) Date of Patent: Nov. 12, 2024

(54) HIGH EFFICIENCY IMPACT MILL

(71) Applicant: Coperion Process Solutions LLC, Kansas City, MO (US)

(72) Inventors: Michael M. Chen, Naperville, IL (US); David M. Podmokly, Downers Grove, IL (US); Jianrong Chen, Naperville, IL (US)

(73) Assignee: Coperion Process Solutions LLC, Kansas City, MO (US)

( * ) Notice: Subject to any disclaimer, the term of this patent is extended or adjusted under 35 U.S.C. 154(b) by 474 days.

(21) Appl. No.: 17/261,131

(22) PCT Filed: Jul. 10, 2018

(86) PCT No.: PCT/US2018/041383
§ 371 (c)(1),
(2) Date: Jan. 18, 2021

(87) PCT Pub. No.: WO2020/013808
PCT Pub. Date: Jan. 16, 2020

(65) Prior Publication Data
US 2021/0260595 A1 Aug. 26, 2021

(51) Int. Cl.
*B02C 13/02* (2006.01)
*B02C 13/282* (2006.01)

(52) U.S. Cl.
CPC ............ *B02C 13/282* (2013.01); *B02C 13/02* (2013.01); *B02C 2013/2825* (2013.01)

(58) Field of Classification Search
CPC ........ B02C 13/02; B02C 13/10; B02C 13/282
See application file for complete search history.

(56) References Cited

U.S. PATENT DOCUMENTS 2,709,048 A * 5/1955 Stark ..................... B02C 13/282 241/285.1
3,829,031 A * 8/1974 Kron ..................... B02C 13/282 241/182

(Continued)

FOREIGN PATENT DOCUMENTS

CA 2267464 A1 * 9/1999 ............. B02C 13/02
CN 1730153 A 2/2006

(Continued)

OTHER PUBLICATIONS

Extended European Search Report issued in corresponding PCT Application No. PCT/US2018/041383, dated Jan. 21, 2022, pp. 1-8.

(Continued)

*Primary Examiner* — Faye Francis
(74) *Attorney, Agent, or Firm* — Robinson & Cole LLP

(57) ABSTRACT

An impact mill using hammers to strike particles and reduce their size as the material progresses through a grinding chamber. Baffles are provided in the grinding chamber, adjacent the interior wall thereof, concentrically about the drive shaft of the mill. The baffles are adjacent to the hammers in the area of hammer sweep and form a path for the material using the flow of air through the mill and the swing of hammers to keep material from falling within the mill and remaining in the hammer sweep area. A variable speed motor varies the rate of movement of the hammers to increase or decrease the rate of strike of hammers to more efficiently and effectively reduce the material passing therethrough. The baffles can be retrofit into existing mills and can be created in angular sections with the lining of the grinding chamber for modular installation and removal.

14 Claims, 13 Drawing Sheets

(56) References Cited

U.S. PATENT DOCUMENTS

| | | | | | |
|---|---|---|---|---|---|
| 3,966,126 | A * | 6/1976 | Werner | B02C 13/282 | 241/27 |
| 4,175,710 | A * | 11/1979 | Robertson | B02C 13/284 | 241/73 |
| 5,062,575 | A * | 11/1991 | Barnabie | B02C 13/282 | 241/73 |
| 5,697,704 | A * | 12/1997 | Coyle | A23L 19/00 | 366/349 |
| 5,887,808 | A * | 3/1999 | Lucas | B02C 13/2804 | 241/82 |
| 5,947,396 | A * | 9/1999 | Pierce | B02C 13/02 | 241/32 |
| 7,134,623 | B2 * | 11/2006 | Elliott | B02C 13/02 | 241/294 |
| 7,748,655 | B2 * | 7/2010 | Schmitz | B02C 13/04 | 241/286 |
| 8,550,389 | B2 * | 10/2013 | Chen | B02C 13/04 | 241/188.1 |
| 9,358,548 | B2 * | 6/2016 | Barthelmess | B02C 17/16 | |
| 10,543,489 | B2 * | 1/2020 | Green | B02C 13/284 | |
| 2006/0065768 | A1 | 3/2006 | Elliot | | |
| 2008/0308660 | A1 * | 12/2008 | Schmitz | B02C 13/282 | 241/27 |
| 2010/0181403 | A1 * | 7/2010 | Kum | B02C 13/282 | 241/300 |
| 2015/0224509 | A1 * | 8/2015 | Serrano | B02C 13/282 | 241/291 |
| 2019/0022661 | A1 * | 1/2019 | Green | B02C 13/13 | |

FOREIGN PATENT DOCUMENTS

| | | | | |
|---|---|---|---|---|
| CN | 2754722 | Y | 2/2006 | |
| CN | 201052465 | | 4/2008 | |
| CN | 202527220 | | 11/2012 | |
| CN | 107185645 | A | 9/2017 | |
| EP | 2364781 | A2 | 9/2011 | |
| WO | WO-9801187 | A * | 7/1999 | B02C 13/02 |
| WO | 2015118448 | A1 | 8/2015 | |

OTHER PUBLICATIONS

International Search Report issued in corresponding PCT Application No. PCT/US2018/041383, dated Apr. 9, 2019, pp. 1-4.

* cited by examiner

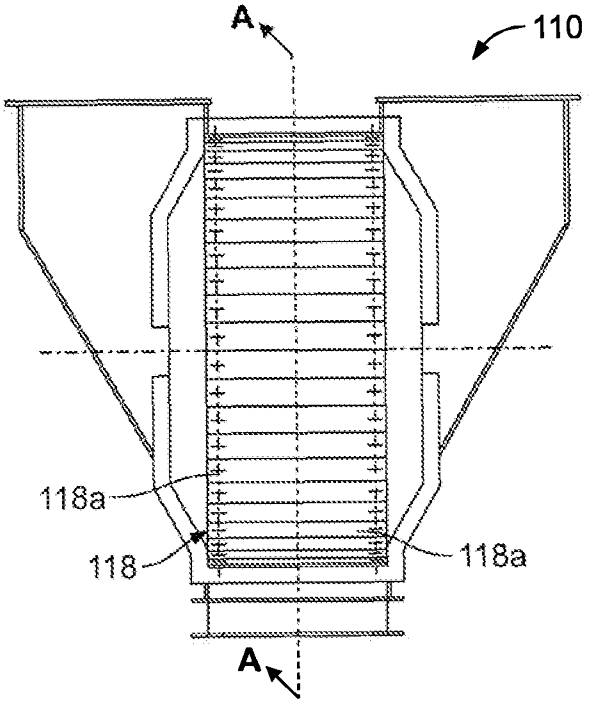
FIG. 4
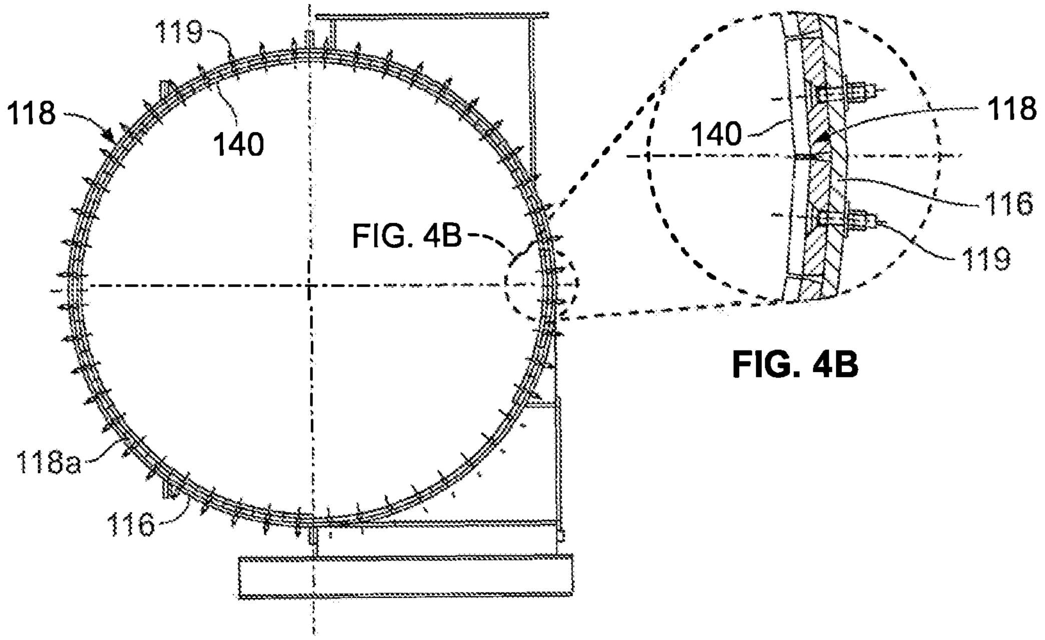
FIG. 4B
FIG. 4A

HIGH EFFICIENCY IMPACT MILL

FIELD OF THE INVENTION

The present invention concerns an impact, or imp, mill. More particularly the present invention concerns an improved impact mill for reduction of biomass agglomerates into particulates for use in numerous industrial applications.

BACKGROUND OF THE INVENTION

A number of processes require the grinding of material using many types of apparatus to grind different kinds of materials. One such grinding apparatus is an impact, or imp, mill, which is a particular type of hammer mill. The imp mill is one form of a pulverizer commonly employed for reducing the size of aggregates and/or agglomerates of minerals, organics and chemicals ("material"). One of the earliest uses to which imp mills were put was that of the grinding, drying and calcining of the gypsum. Imp mills are also widely used in the complete processing of such products as organic insecticides, soya flour, starches, litharge for storage batteries, phosphate materials, synthetic resins, potassium compounds, clay materials and in literally dozens of other applications in which precision grinding and drying are an important part of the production process.

Imp mills generally have a plurality of hammers suitably attached to a row of disks, which in turn are attached to a rotor shaft or shaft, which are housed within a cylindrical grinding chamber. The grinding chamber has an air inlet and an air outlet disposed to allow forced air to pass through the grinding chamber and carry pulverized material (i.e., coal) of a desired size out of the imp mill. Each row of hammers includes a plurality of hammers disposed circumferentially around a corresponding disk or pair of adjacent discs. The hammers may be fixed rigidly or pivotally pinned to the disks. In operation, as the rotor and disks are rotated by a motor, material is fed into one end of the grinding chamber. Typically, the motor is operable only at a constant speed and is directly connected to a shaft that rotates the hammers into an area swept by the hammers. The rotating hammers crush and pulverize the material as the material progresses through the grinding chamber. The dimensions of the disks and hammers, number of hammers, rotor speed, the flow rate of the air through the grinding chamber, and the dimensions of the grinding chamber determine the particle size exiting the outlet of the imp mill.

In a normal operation of an imp mill, material enters the mill and is subjected to the process of being impacted by hammers so that the material is broken down in size as it progresses through the mill. Material is struck by hammers, impacts against the walls of the mill and hits other pieces of material, heavier material tends to fall and lighter, or broken down bits of material blow through the mill. Typically, a screening device or classifier is provided at the end of the mill and material of a particle size that fits and/or can pass through the classifier is carried by the airflow exiting the mill as appropriately sized material for its intended use, oversized material that does not pass through the classifier falls into a catch and is returned to the entry point of the mill for more processing. Classifiers are generally either of static or dynamic configurations. Static classifiers typically have a frusto-conically shaped filter relying entirely on filtration to classify material. Dynamic classifiers typically have a rotating cage and/or a rotating whizzer in the form of a vaned impeller relying additionally on their rotation flinging particles, in particular those oversize, away from airflow paths exiting through the classifier. In both types of classifier, the amount of returned material is determined by the ability of the airflow exiting the mill to carry airborne suitably sized material from the grinding chamber through the classifier. It will be understood that the weight of significantly oversized material particles prevents them becoming airborne or remaining airborne within the airflow exiting the mills toward the classifier and these do not reach and are therefore not filtered by the classifier.

Thus, material in the grinding chamber is continuously ground preferably to the desired size, and it may be carried by airflow numerous times to the classifier until it can pass through which is its ultimate objective. While eventually most material succeeds in passing through such classifiers, the repeated return of material from the classifier to the grinding chamber is energy inefficient and costly.

In the case of biomass materials, it has been found that the classifier, due to the lower material density, receives for filtration proportionally more oversized material particles than in the case of denser/heavier mineral aggregates, for example. Consequently, the classifier may need to be made oversized and/or in the case of dynamic classifiers operated more aggressively to accommodate the process, resulting in higher costs for such a device and increased and higher energy consumption as well. Moreover, for biomass materials, efficient classification is a challenge because of the fibrous feature of the material.

A need therefore arises for an imp mill that provides consistent and thorough grinding of material so that substantially all material that enters the mill exits in one pass at the desired size. Part of the problem is that some particles of material do not stay within the sweep area of the hammers due to centrifugal force acting on them and push them to the outer casing of the mill therefore become airborne and carried toward the classifier before adequate grinding can occur. A means to retain particles of material in the range of the hammer, utilizing the natural flow of air through the mill would allow for more hammer hits per particle of material, insuring that a cycle through an imp mill would include several strikes to larger particles and thereby require fewer cycles to process. Additionally, if a process of maintaining particles in the range of hammers is created, manipulation of the airflow and speed of rotation of hammers would allow users to run such a mill to substantially break down an entire batch of material in a single cycle. Means to keep particles in the range of the hammers with a lessening of the speed of air flow and an increase in the rotation of the hammers, would in some instances, provide the requirements for biomass materials to be broken down to the desired sizes more efficiently and with less cycles of imp mill use. An imp mill running fewer cycles would result in lower labor, and maintenance costs, as well as lower unit energy consumption; a more efficient imp mill would be smaller in size, require no external classifier and therefore be more efficient, more space saving and lower costs of operation and energy use.

It would also be useful to provide a means to retrofit existing impact mills so as to make them more efficient and cost effective without having to replace the entirety of the device.

It is therefore an object of the present invention to provide a means for keeping particles to be reduced in the range of the hammers in an imp mill. It is a further object to be able to retrofit existing imp mills such that they can more efficiently reduce material size. Other objects and advantages of the present invention will become apparent as the description proceeds.

SUMMARY OF THE INVENTION

In accordance with the present invention, an improved apparatus for grinding materials into useful particles is provided; wherein the device causes larger elements of material, that otherwise would fall through a typical mill and need to be sent through innumerable times until it is reduced to the appropriate sized particles, to be ground in one pass saving time and money. The invention provides an element that causes particles to be lifted, on a current of air, and brought back into the area of strike of the grinding mechanism to allow the imp mill to run more efficiently and quicker while grinding the material to desired sizes. The particular disclosure is adapted to the grinding of biomass, however, it will be seen that the present invention can be adopted to any material typically ground in an imp mill.

In the present invention, an apparatus for pulverizing material, is provide, the apparatus comprising a housing defining a grinding chamber with an interior wall about the grinding chamber, an inlet conduit for feeding the material into the grinding chamber and an outlet conduit for directing pulverized material from the grinding chamber. Disposed within the grinding chamber is a shaft operably attached to the motor, the shaft traversing at least a part of the grinding chamber. Additionally, there are a plurality of hammer disks axially spaced along the shaft and a plurality of rows of hammers attached to the hammer disks and extending perpendicularly from the shaft towards the interior wall of the grinding chamber, the hammers of each respective row of hammers being circumferentially spaced and having an attachment end and a head. In use, the heads of the hammers are separated from the interior wall of the grinding chamber. In addition, one or more annular baffles are provided in the grinding chamber. Each baffle comprises an outer circumference and an inner circumference and is attached at its outer circumference to the interior wall of the housing. In this way the one or more baffles are coaxial with the shaft and the inner circumference of the one or more baffles extends into the grinding chamber adjacent to the heads of the plurality of hammers; the baffles are designed to affect the flow of air and particles therein and thereby increase the residence time of the material in proximity to the hammers and also prevent any bypass of particles without being hit by the hammer. In a preferred embodiment, the grinding chamber is generally cylindrical in configuration and the baffles made to the correct dimensions will fit the chamber at the outer circumference of the baffles; the inner circumference of the baffles, depending therefrom, are set so that the heads of the hammer swing within the body of the baffle adjacent to the wall formed by the baffle. In a preferred embodiment, there are at least as many annular baffles as rows of hammers and the hammers and baffles are interlaced with each other and circumferentially spaced relative to the shaft. The baffles form a path for material to pass through and be continually urged into the sweep path of the hammers so that the material is struck more often and is more efficiently ground down. In another embodiment, the baffles are made with segments open such that a discontinuity in the baffle exists to provide a shearing effect, with the hammers, against the material to be removed; in some embodiments the segmented baffles can be used in association with full annular baffles, in the same mill, to create a desirable program of shearing and reduction of material at the most economical and rapid method.

Additionally, baffles can be made as annular rings or can be segmented rings and one or the other or a combination of such rings can be included in a mill as desired. The use of segmented rings provides a shearing force to more efficiently cut large pieces of material and provide a variated flow of air therethrough to make such processes more efficient.

In a preferred embodiment, the motor of the present invention is a variable speed motor such that the operator can manipulate the system so that there can be either fewer hammers with each hammer travelling faster about the shaft or more hammers with each travelling slower or some combination or permutation that provides grinding and efficiency. The variation in speed in the motor thereby allowing the user to set a proper speed for the number of hammers so that the grinding of the material can be nominally completed in one pass through the grinding chamber. It will be understood that the variation in speed allows the device to be tuned to conditions so that grinding is made efficient both in time of grinding and energy used for grinding.

In embodiments of the invention, the annular baffle can be attached to the inside wall of the grinding chamber in any manner available, including welding, adhesives and fasteners. It will be seen that the use of fasteners is the most efficient and easiest manner of attachment. In addition, the rings can be formed in the chamber at the time the chamber is created. As will be explained, the baffles can be added in a new mill and can be retrofitted into existing mills. Such retrofit can include the removal of the shaft and hammers from the mill, the attachment of the annular baffles to the walls of the existing mill and then the replacement of the shaft and hammer structure to the mill. Further, in some embodiments, the baffles and liner of the grinding chamber can be made in segments such that assembly of the liner and baffles within a grinding chamber can be easily accomplished; in a preferred embodiment the segments can be installed in a grinding chamber without removal of the shaft and hammer assembly. Additionally, if damage is clone to a section of a baffle or lining, that component piece can be easily removed and replaced with a minimal amount of down time for the device. In a preferred embodiment the sections are generally made as one eighth of the circumference of the liner for ease of attachment and removal, as required, without disturbing the motor, shaft and hammer systems. It will be understood that different segments comprising varying spans of the circumference can be used without departing from the novel scope of the present invention.

In the preferred embodiment, the hammers of the apparatus are pivotally attached to the hammer disks, but in other embodiments, the hammers are fixedly attached to the hammer disks. A motor rotates the hammers in the mill and in a preferred embodiment the motor is a variable speed motor and varying the speed of the motor affects the rate of movement of material through the grinding chamber and the effectiveness of the grinding process. Such action with the motor can be adjusted so that a single pass of material through the mill has an opportunity to grind substantially all of the material to the desired grind size in one pass.

The present invention includes a method of retrofitting a grinding chamber with the baffles of the present invention, which includes the steps of providing a grinding chamber as described above and then attaching through the use of fasteners, or others fastening means as is known to persons having ordinary skill in the art, the baffles to the liner wall of the grinding chamber so that the hammers therein are positioned to pass near the baffles as the mill operates. The operation thereof causing a change in the characteristic of the flow of air such that material to be ground is maintained by the baffles near the hammers and is thereby ground to a desirable size in a single pass through the grinding chamber. As noted above, retrofitting can be clone by assembly of baffles to an existing liner or by installing segmented sections of liner and baffles.

A more detailed explanation of the invention is provided in the following description and claims and is illustrated in the accompanying drawings.

BRIEF DESCRIPTION OF THE DRAWINGS

FIG. 4 is a cut away elevational view of one embodiment of an impact mill made in accordance with the teachings of the present invention.

FIG. 4A is a cross-sectional view of a baffle assembly taken along the line A-A of FIG. 4.

FIG. 4B is an enlarged view of a feature of the baffle assembly of FIG. 4A.

DETAILED DESCRIPTION

Figure 1:
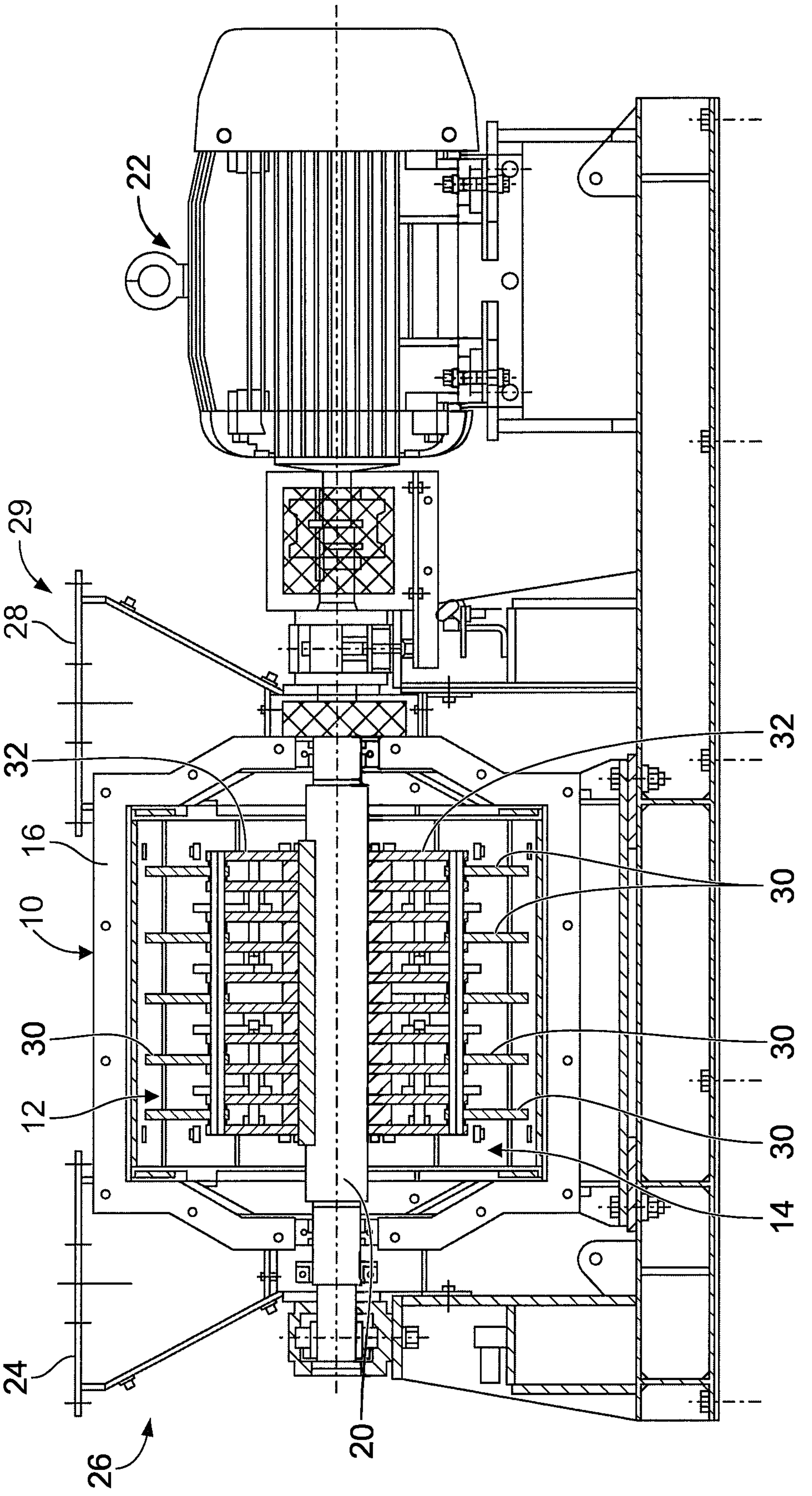
FIG. 1 (Prior Art)
FIG. 1 is a front elevational view of an impact mill of the prior art.

While the present invention is susceptible of embodiment in various forms, there is shown in the drawings a number of presently preferred embodiments that are discussed in greater detail hereafter. It should be understood that the present disclosure is to be considered as an exemplification of the present invention, and is not intended to limit the invention to the specific embodiments illustrated. It should be further understood that the title of this section of this application ("Detailed Description of the Illustrative Embodiment") relates to a requirement of the United States Patent Office, and should not be found to limit the subject matter disclosed herein.

An impact or imp mill 10 made in accordance with the teachings of the present invention, shown in FIGS. 2 and 3, will be described in detail herein and will be contrasted with a prior impact mill, from the same inventor, to better disclose the present invention and distinguish the improvements herein.

An impact mill 10, of the prior art, is shown in FIG. 1, and is used for pulverizing, grinding, or crushing. Referring to FIG. 1, the imp mill includes the grinding apparatus 12 disposed in a grinding chamber 14. The grinding chamber 14 is defined by a generally cylindrical housing 16 having an interior liner 18 disposed therein. The prior mill provides a grinding apparatus 12 whereby the grinding elements 30 (e.g., hammers) are provided within chamber 14 and circulated about the chamber through attachment to rotor 20, being rotated by a motor 22, in a manner known to persons having ordinary skill in the art. As will be understood, a portion (not shown) of the housing 16 is releasably attached to the imp mill 10 to permit maintenance of the grinding apparatus 12. It will be understood that the removal portion maybe attached by quick release latches (not shown). The mill includes an inlet conduit 24 disposed at an input end 26 of the mill and an outlet conduit 28 disposed at an output end 29 of the mill, whereby the grinding apparatus is disposed therebetween. The inlet conduit 26 receives unground or raw material for depositing into the grinding chamber. The resulting ground material exits the outlet conduit 28 with an air stream that flows in through the inlet conduit 26, then passes through the grinding chamber 14 and exits the mill through the outlet conduit 28.

Figure 2:
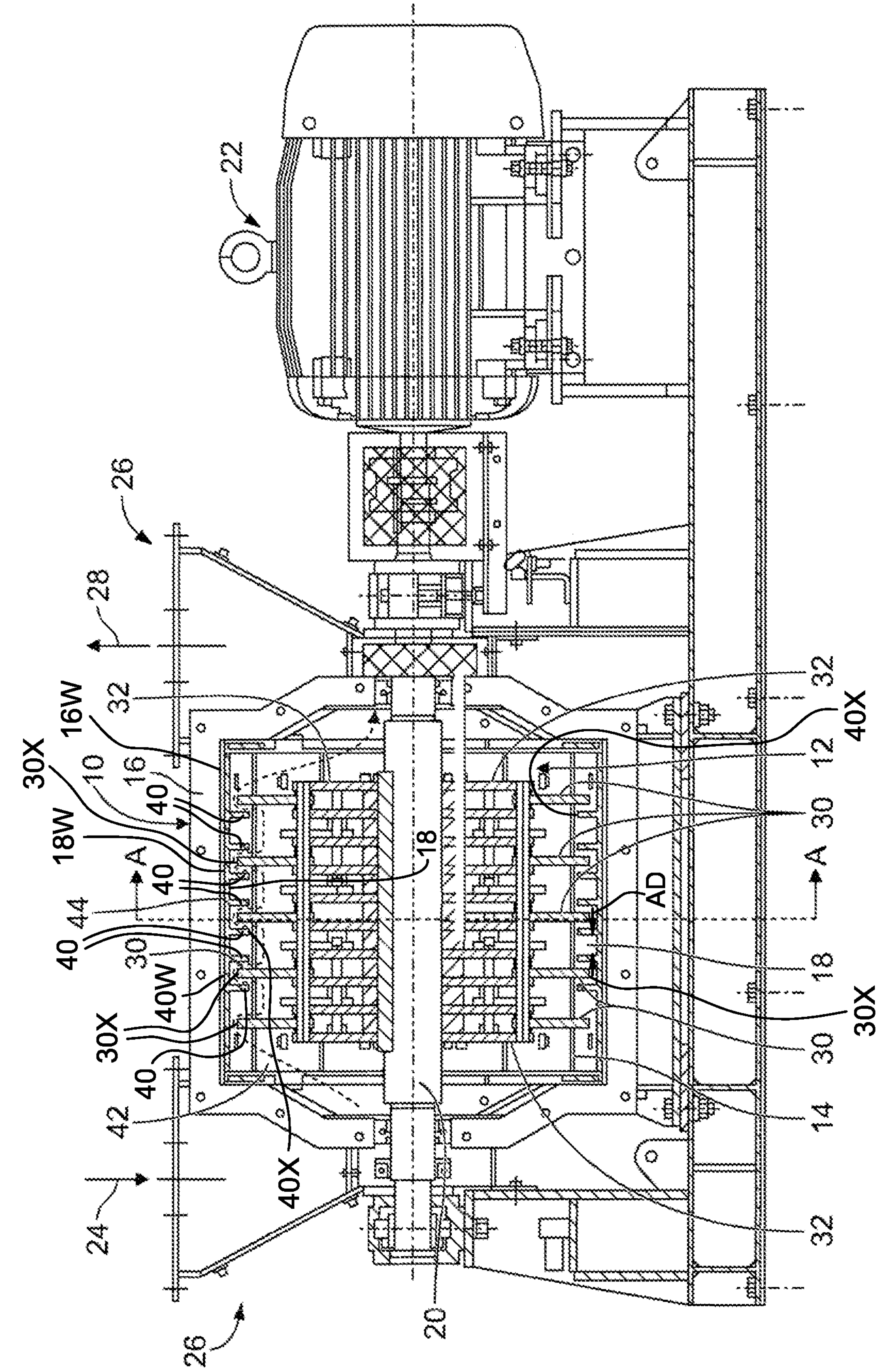
FIG. 2 is a front elevational view, partially cut away, of an impact mill made in accordance with the teachings of the present invention.
Figure 3:
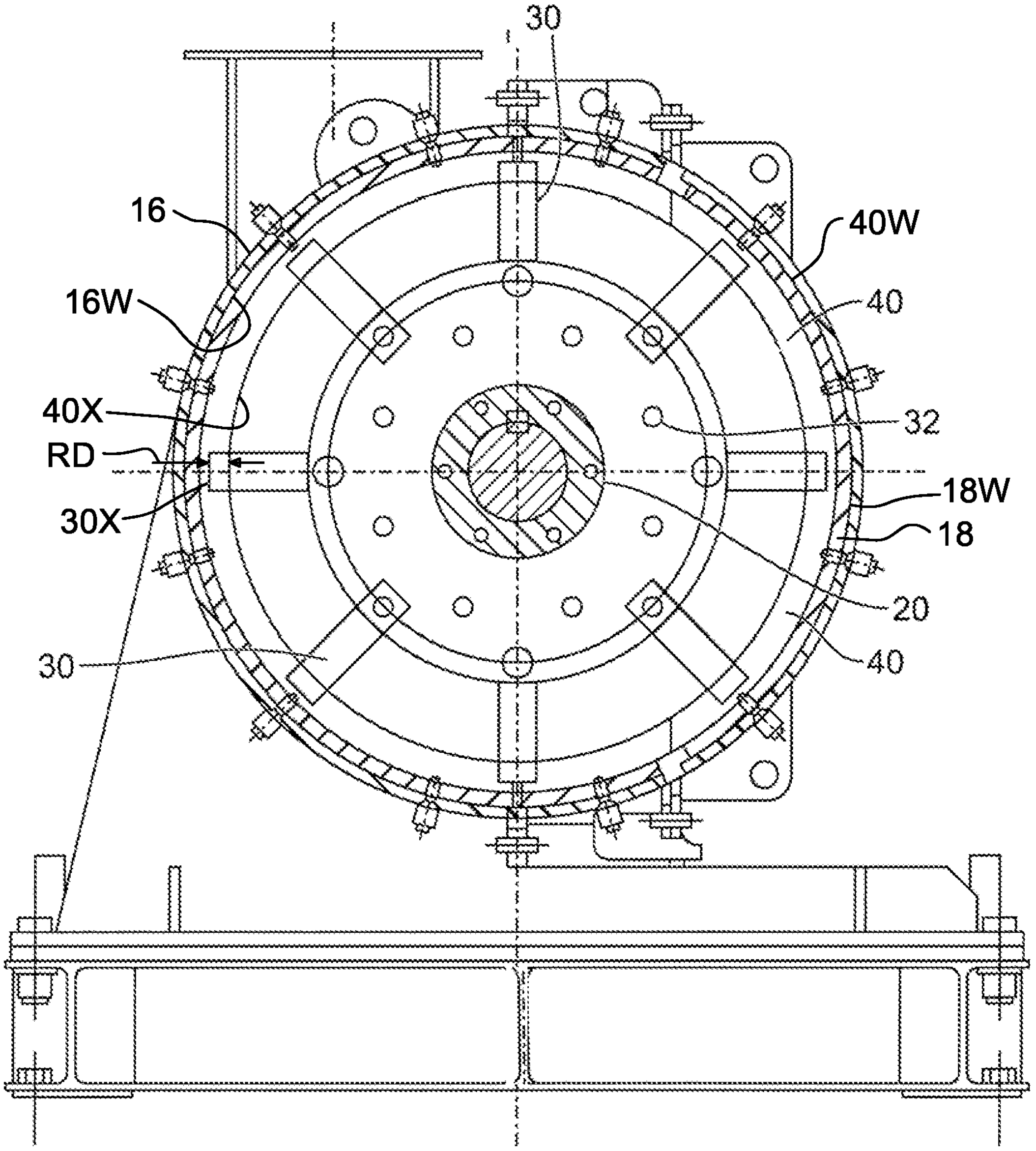
FIG. 3 is a cross-sectional end view of the mill of FIG. 2 taken along the line A-A of FIG. 2.

Referring now to FIG. 2, where like items will be numbered similarly, impact mill 10, in accordance with the present invention, is shown and will be described as a mill used to pulverize biomass materials. It will be appreciated that the present invention may be used to grind or pulverize any suitable material as required by the user. The exemplary embodiment described provides a grinding apparatus 12 whereby the grinding elements 30 are hammers.

In the mill shown in FIG. 2 the grinding apparatus 12 includes a plurality of hammers 30 pivotally attached to a plurality of hammer disks 32, thus allowing the hammers to move on impact with the material to be crushed and thereby reduce the stress on the hammers. It will be understood that hammers 30 can be fixedly attached as well, without departing from the novel scope of the present invention. The hammer disks 32, as shown, are attached axially along a portion of a shaft or rotor 20 shown disposed horizontally. In the exemplary embodiment shown, the grinding apparatus 12 comprises axially-spaced hammer disks 32 whereby each row of hammers 30 disposed thereon are disposed in a corresponding spacing between the hammer disks. It will be understood by persons having ordinary skill in the art that hammers 30 and hammer disks 32 can be placed in the grinding chamber 14 in any manner that causes the efficacious grinding of material without departing from the novel scope of the present invention. It will be understood that the illustrated showing of hammers and hammer disks is for illustrative purposes only, such that the interaction of the hammer 30 head and annular baffles 40 shown in the drawings and explained herein will occur regardless of the manner in which the hammers and/or hammer disks are attached within the mill 10.

Each of the rows of hammers 30 is therefore disposed axially along the rotor 20. Each row of hammers includes a plurality of hammers circumferentially spaced around the hammer disks 32. The circumferential spacing, of the hammers of each row of hammers, is shown as approximately equally spaced. Further, the hammers of each row have diametrically opposed hammers to evenly distribute the mass around the respective hammer disk to thus reduce vibration and wear of the rotor 20 and bearings (not shown). The hammers 30 are normally staggered aligned from row to row as this has been found to from a very effective grinding means and allows the mill to run balanced and effectively.

In FIG. 2, seven annular baffles 40 (e.g., rings) can be seen in cross-section depending radially inward from a liner 18. It will be seen that in a preferred embodiment, the annular baffles 40 depend from the liner 18 to a degree such that hammers 30, as they move, are adjacent to the annular baffles 40 and pass adjacent annular baffles 40 for their entire pass within mill 10. In the preferred embodiment shown in FIGS. 2 and 3, the annular baffles are attached to the liner 18 such that radially outer surface 40W of the annular baffles 40 and radially outer surface 18W of the liner 18 form a seal 44 with a radially inward facing surface 16W of the cylindrical housing 16 such that material generally cannot flow between the cylindrical housing 16 and the annular baffles 40 and the liner 18. Such attachment can be by welding the annular baffles 40 onto the radially inward facing surface 16W, attaching the annular baffles 40 by adhesives or mechanical fasteners or creating the annular baffles 40 with the liner 18 at the time of the formation of the grinding chamber, all without departing from the novel scope of the present invention. As shown in FIG. 3, each of the hammers 30 has a radially outward facing outermost extent 30X and each of the annular baffles 40 has a radially inward facing innermost extent 40X. The radially outermost extent 30X of one or more of the hammers 30 extends radially outward beyond the radially innermost extent 40X of one or more of the annular baffles 40, by a radial distance RD. As shown in FIG. 2, radially outermost extent 30X of one or more of the hammers 30 is positioned axially between two adjacent annular baffles 40. As shown in FIG. 2, adjacent baffles 40 are spaced apart from one another by an axial distance AD.

The rings are given an effective shape so as to form, with the movement of the hammers 30 and the air flow introduced at inlet conduit 26 a particular flow 42 of air that forces the material to be ground to remain and/or to reenter the area of hammer sweep, continuously, before, during and after a hammer strike, such that the material is continuously subjected to grinding action. In addition, in a preferred embodiment, a mill includes a variable speed motor 22 and/or transmission, such that the flow of material can be regulated as well by the actions of the motive forces within the mill.

While the circumferential spacing of hammers 30 of each row is shown as being substantially equal, the present invention further contemplates that the circumferential spacing may not be substantially equal and the spacing of annular baffles 40 can be made to compensate for such changes. Further, while each row of hammers 30 is shown as having the same number of hammers, the present invention contemplates that the number of hammers in each row may be different between rows as well as the circumferential spacing between hammers may be different with the annular baffles 40 being spaced accordingly to best create the flow of material and air desired.

It will be understood that while the annular baffles 40 of the present invention can be created in a new mill, there is no reason why, and therefore it is contemplated that such will occur, that the annular baffles 40 can be retrofitted into any cylindrical type imp mill to improve the action of the mill in grinding material, particularly bio-mass material and gypsum. In the case of gypsum, the annular baffle 40 will avoid bypass and increase the residence time for the particles to be calcined more uniformly. Further, it is contemplated that such a retrofit can occur in a mill having a steady rate motor or in a mill with a variable speed motor-both being improved by the addition of annular baffles 40.

While the hammers 30 are shown and described as being pivotally attached to the hammer disks 32, the hammers may be fixedly attached to the hammer disks.

While the imp mill embodying the present invention shows and describes each hammer disk 32 having at least two hammers 30 attached thereto, the present invention contemplates that at least one hammer disk may have no hammers 30 attached thereto to thereby provide a greater spacing between adjacent rows of hammers adjacent to the hammerless disk; for which the annular baffles 40 may be placed closer together or further apart to provide the flow 42 desired. For example, referring to FIG. 1, the hammer disk of one row may not have any hammers disposed thereto, and thus providing a gap between the two adjacent rows greater than the gap between single rows. It is also contemplated that a plurality of hammer disks may not have hammers in any pattern of disks with and without hammers, such as every other interior row are missing hammers, or adjacent rows are missing hammers, having some small effect on the flow which can be compensated by adjusting positions of the annular baffles 40 or changing the speed in the variable speed motor, without departing from the novel scope of the present invention.

Figure 5:
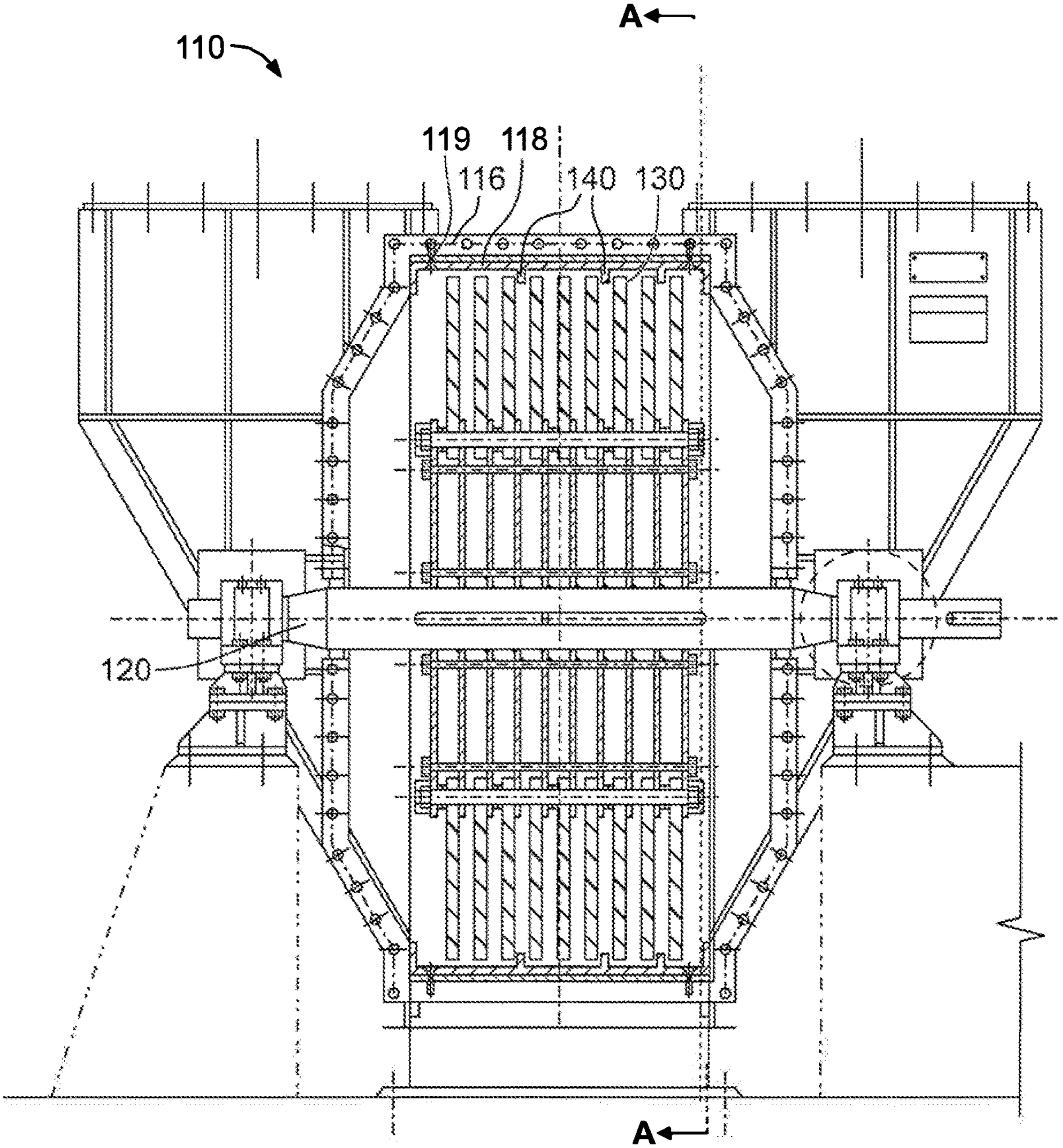
FIG. 5 is a cut-away elevational view of another embodiment of the impact mill.
Figure 5A:
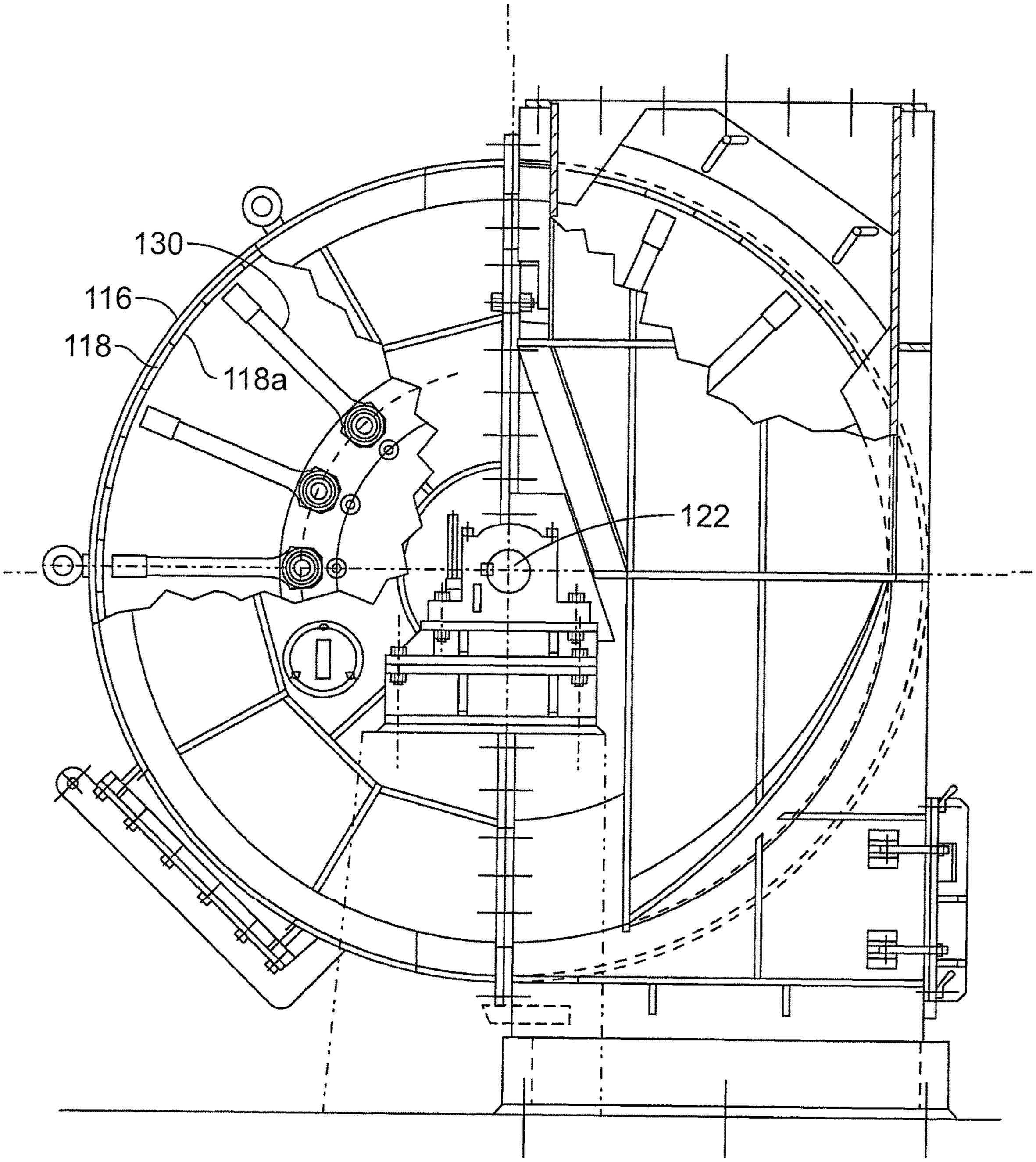
FIG. 5A is a cross-sectional and partial end view of the interior of the impact mill, taken along the line A-A of FIG. 5.
Figure 6:
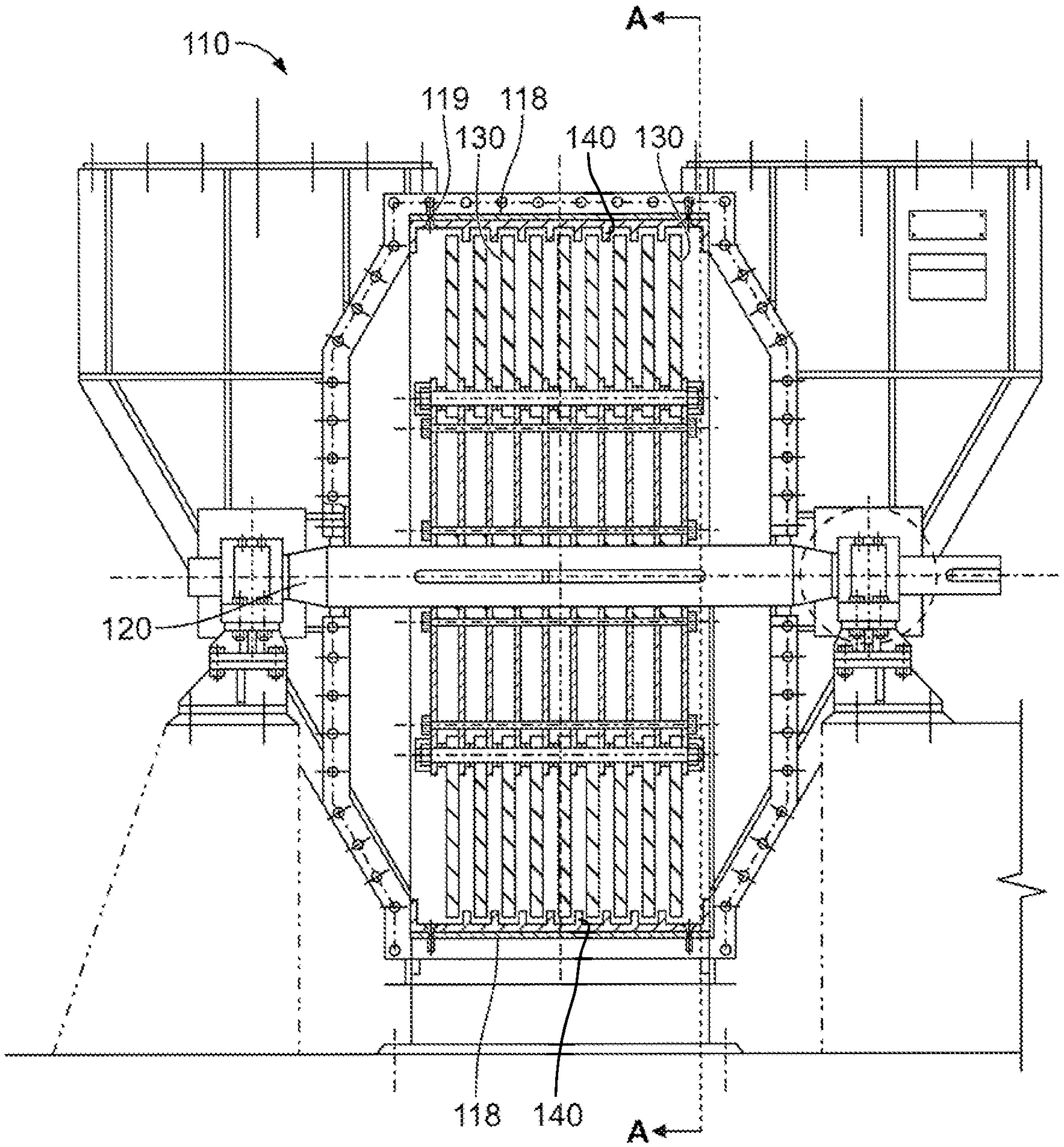
FIG. 6 is a cut-away elevational view of another embodiment of the impact mill.
Figure 6A:
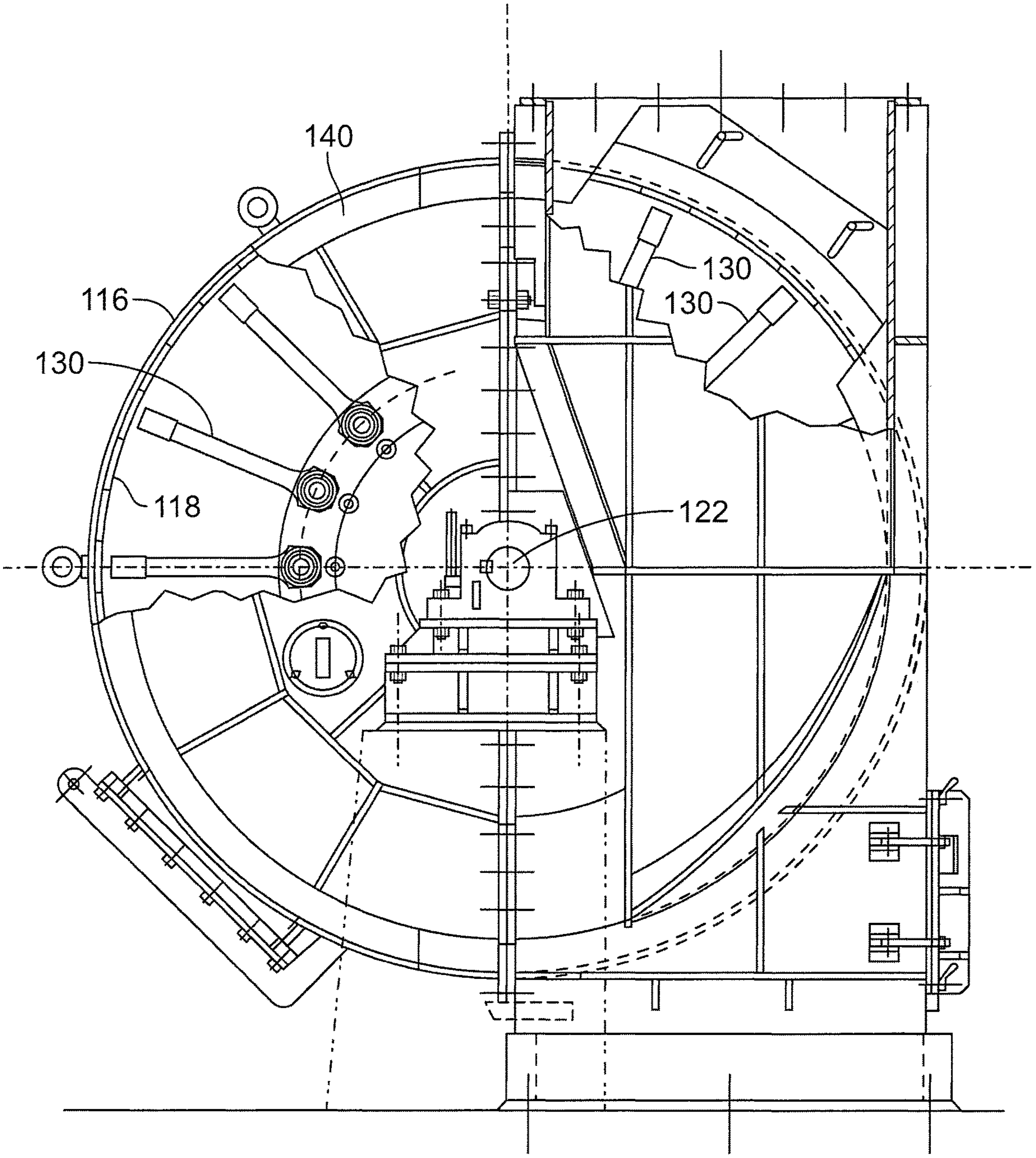
FIG. 6A is a cross-sectional and partial end view of the interior of the impact mill, taken along the line A-A of FIG. 6.
Figure 7:
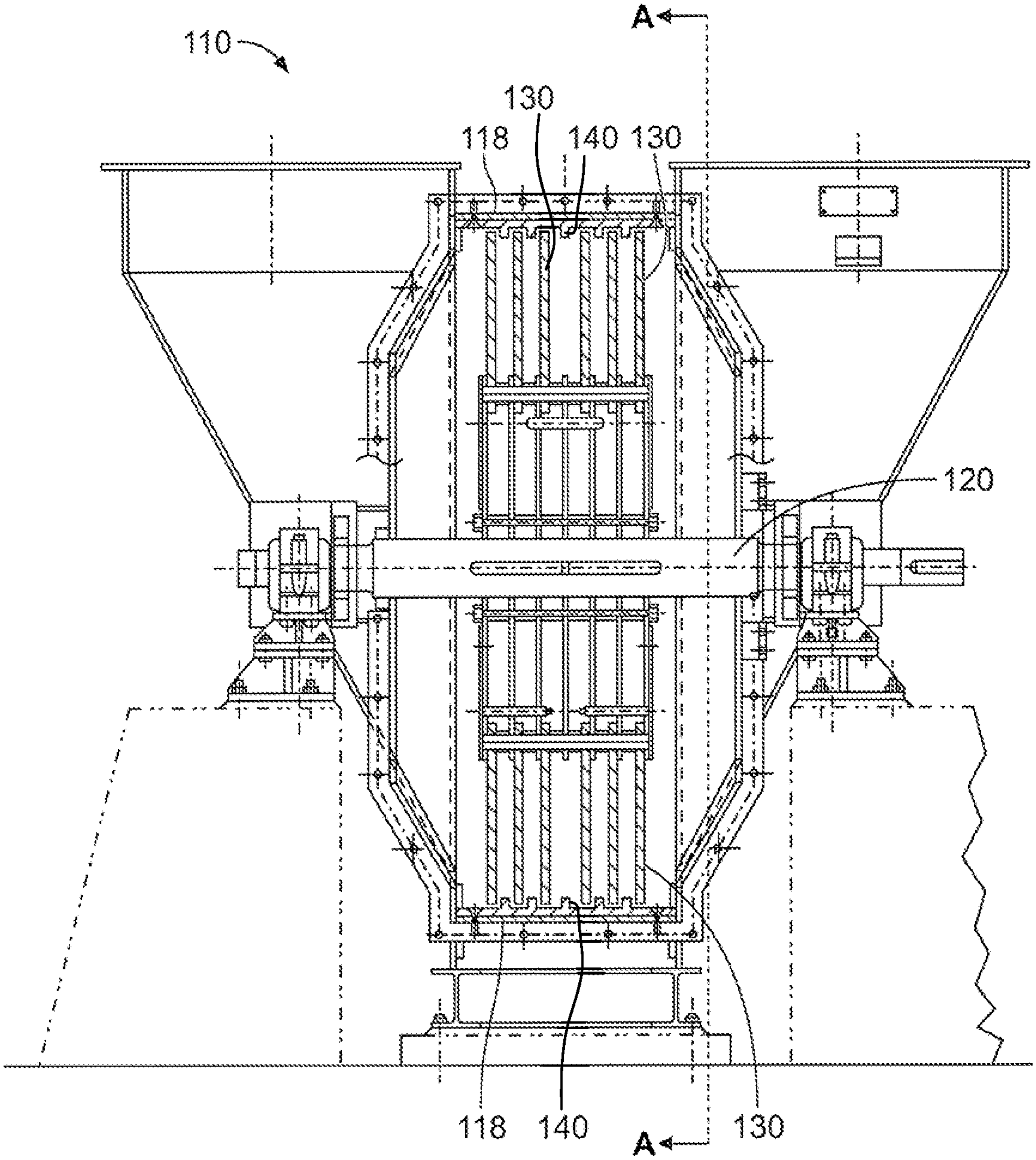
FIG. 7 is a cut-away elevational view of another embodiment of the impact mill.

Referring now to the remaining figures, where like numbers are used to refer to like features, it will be seen that the annular baffles can be configured for use in existing mills (as well as new mills) and can be retrofitted to provide the benefits of the present invention to all impact mills. Referring now to FIG. 4, et seq. variations on the baffles and the method of installation are shown. In FIG. 4A, there is shown a cylindrical housing 116 a liner 118 formed of segments 118*a* that can be attached together within the mill 110 so as to aid in installation of the baffles 140. As shown in FIGS. 4A and 4B, the baffles 140, and liner 118 can be attached to the mill 110 by fasteners 119. As shown in FIG. 5, and as viewed at another angle, liner 118 and baffles 140 can be seen in relation to the workings of the mill 110, including the hammers 130 and rotor 120. In FIG. 5, there are only a few baffles 140 in use in the mill 110; FIG. 6 comprises a mill of a similar style, having baffles 140 at each hammer location. In the creation of the mill of FIG. 5 it will be understood that the baffles can be made with the liner in a casting process that created both together; simplifying the construction of the mill and strengthening the baffles as part of the liner. FIG. 5 shows a mill 110 having 9 rows of hammers while FIG. 7 is a similar device having only 6 rows of hammers 130. FIG. 6 shows a mill where all rows have baffles 140 and hammers 130 while FIG. 7 shows a mill 110 where all rows have baffles, but only certain rows have hammers. The variations shown are an indication of various configurations that can be included in a mill. The actual number of baffles to be used will be determined based on test results. It will be understood by persons having ordinary skill in the art that the advantage of this design is that the baffle can be casted together with the liner with wear resist material (alternatively, it can be fastened to the liner in any number of manners including, but not limited to using fasteners, namely a bolt system, riveted together or welded). It will be seen that installation of such liner will be relatively easy with the rotor in place. Each segment can be flat in radial direction. While there may be a disadvantage in that if one baffle row wears out and starts to affect the fineness results such that compensation cannot be made there may then be a need to change the whole liner segment. However, it will be understood that the changing of a liner segment would be more efficient and less costly than replacing the entire lining.

Figure 8:
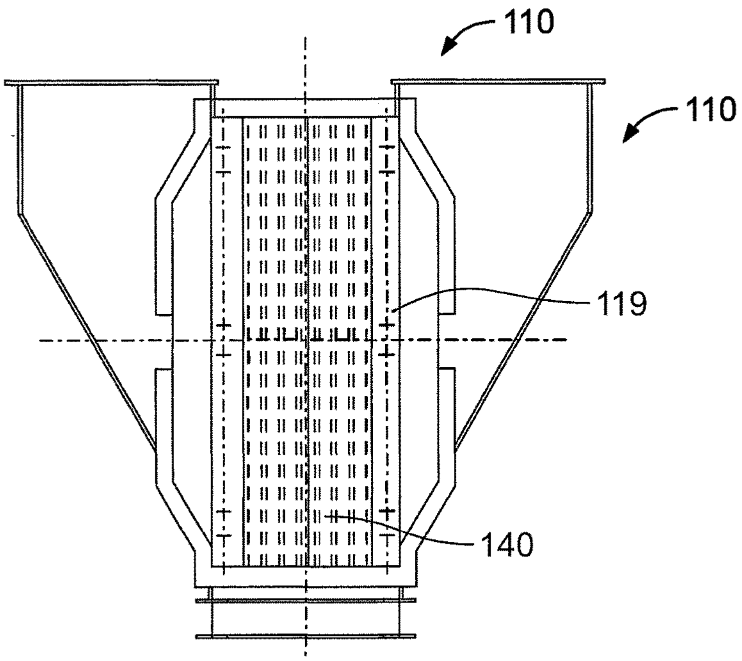
FIG. 8 is a cut-away elevational view of another embodiment of the impact mill.
Figure 8A:
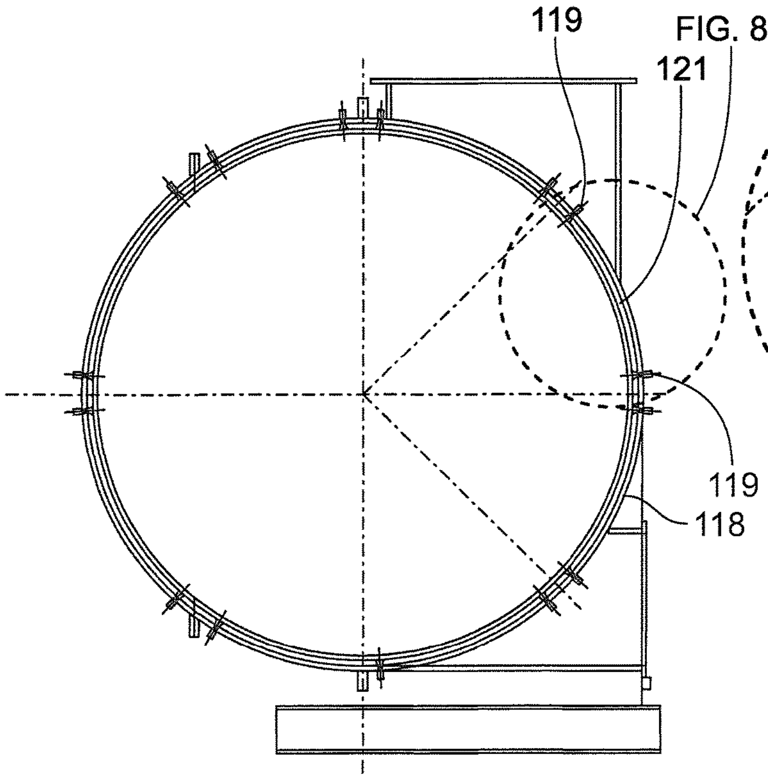
FIG. 8A is a cross-sectional view of a baffle assembly taken along the line A-A of FIG. 8.
Figure 8B:
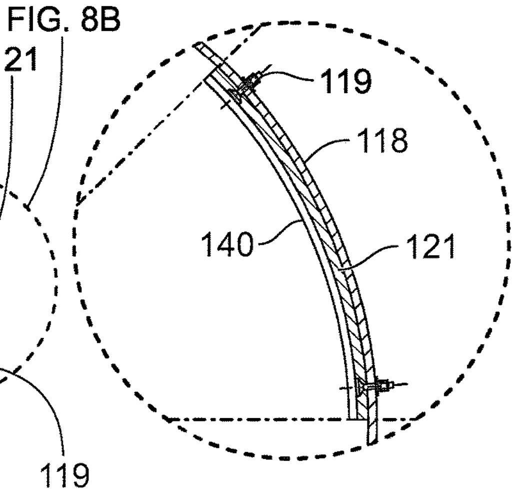
FIG. 8B is an enlarged view of a feature of the baffle assembly of FIG. 8A.
Figure 9:
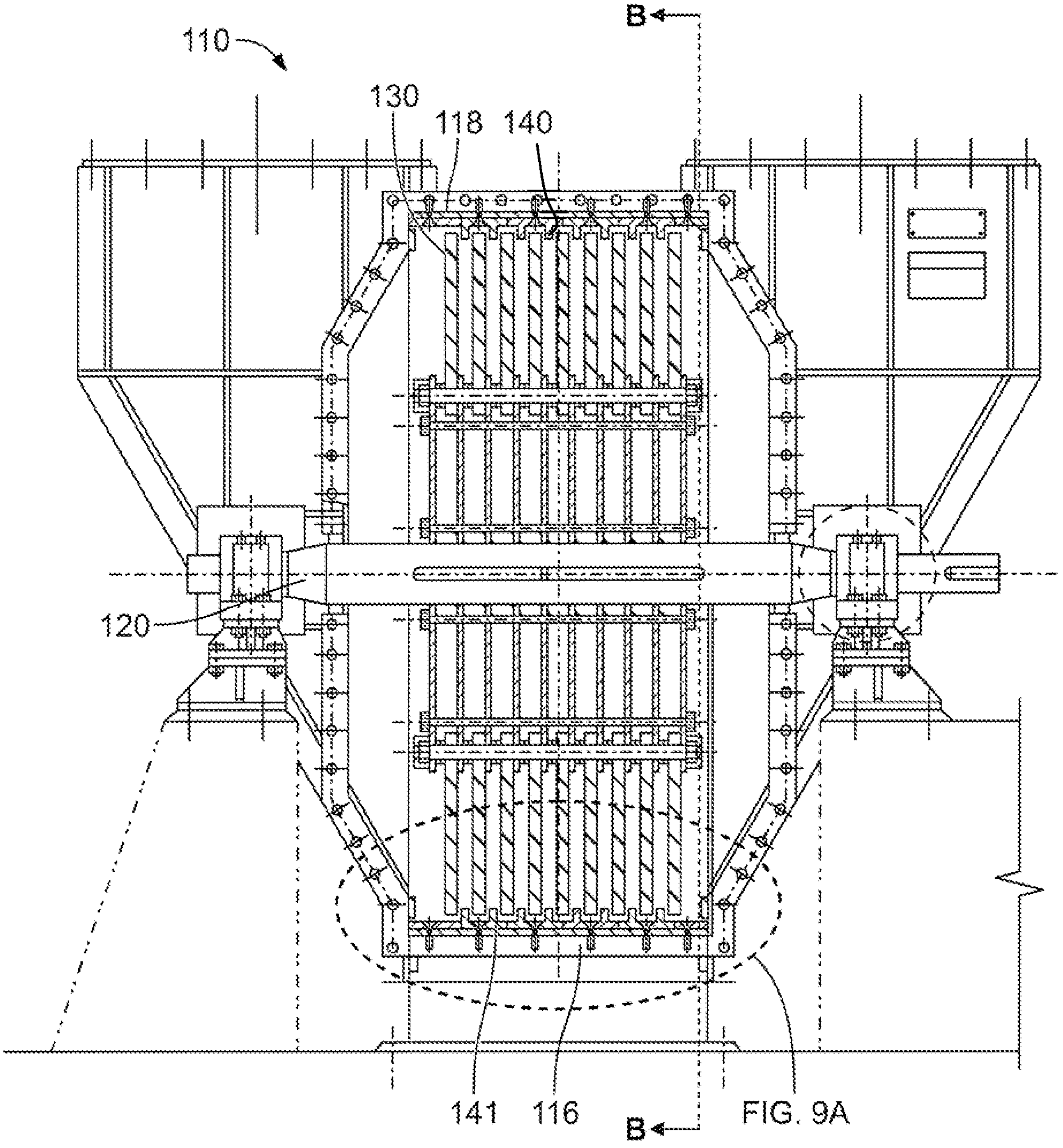
FIG. 9 is a cut-away elevational view of another embodiment of the impact mill.
Figure 9A:
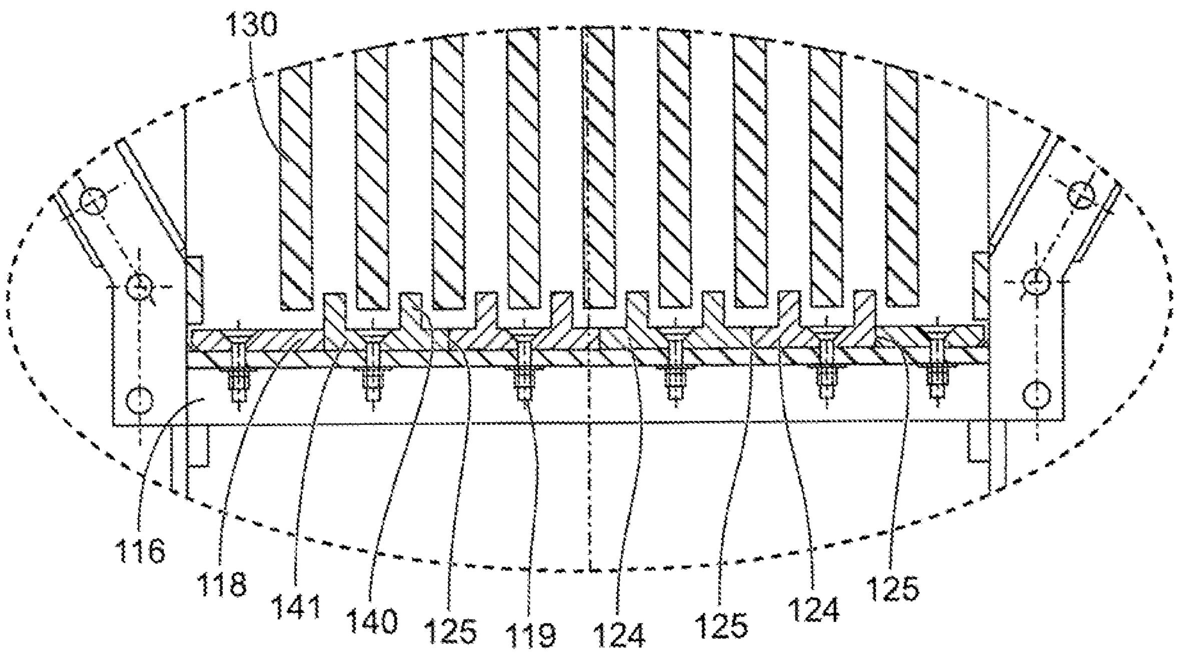
FIG. 9A is an enlarged view of section B-B of the impact mill of FIG. 9.

Referring now to FIGS. 8-9 therein is shown an alternative design with segments in both radial and axial direction. The advantage of this design is that each baffle can be changed out independently when worn. FIG. 8 shows the segmented segments of the liner 121 and baffle 140, FIGS. 8A and 8B show how the baffles are attached to the liner with bolts, which, as shown in FIG. 8B clearly show that the bolts 119 holding the baffles 140 to the liner 121 can be arranged so that the interior of the mill is not interrupted by the bolts 119 and the flow of air and particles is not affected. It will be seen that in the use of the mill of FIG. 8, if it is determined that more or fewer baffles are needed, than presently available, to complete the grinding of material in an efficient methods, the mill can be opened and the segmented section of the liner and baffles can be quickly removed and replaced to refit the mill with the appropriate baffle configuration. FIG. 9 is another example of a mill having hammers 130 in each row of baffles 140, providing maximum striking, and being operable to rotate the mill at variable speeds to affect strikes and timing for particles to enter and emerge in a desired condition. As can be seen in FIG. 9*a*, the enlarged showing of section B-B of FIG. 9, the baffles 140 and liner 118 in this mill are created together, as a combined interior 141, during the casting process and further are in segmented sections 124, abutting each other at segment edges 125. The combined interior 141 is attached to the mill housing 116 by bolts 119. FIG. 9A shows how the installation of bolts 119 so that the heads are flush or below the surface of combined interior 141 creates a smooth surface in order not to affect the flow of air through the baffle system to aid in the movement of matter to be ground. The mill of FIG. 9 is shown having a shaft and motor similar to that shown above, and it will be understood that the motor, through variation of speed, can turn the shaft at a rate as required so as to grind matter in one pass. Persons having ordinary skill in the art will understand that the combination of variation of speed and numbers of hammers and baffles can be changed and adjusted to secure a desirable grind rate.

Figure 10:
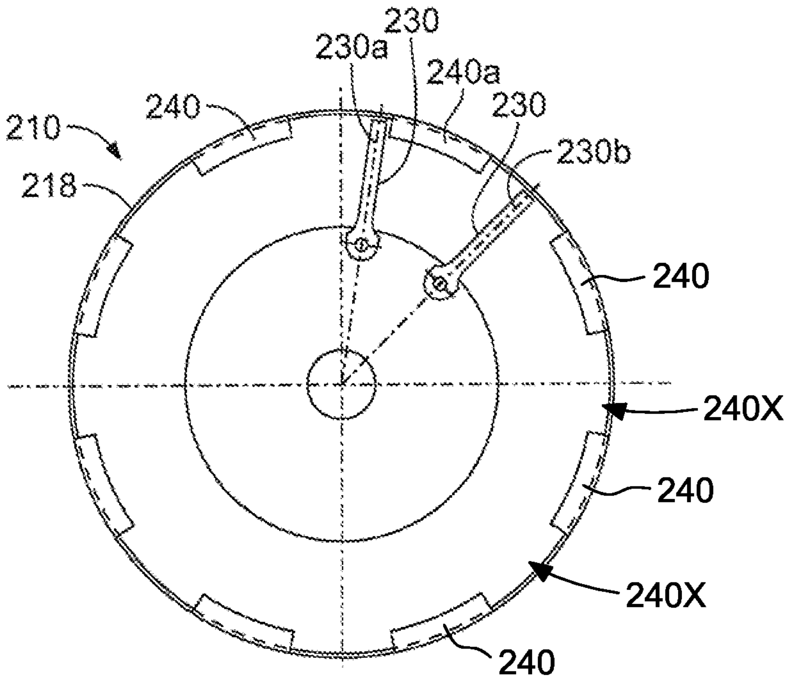
FIG. 10 is cut-away elevational view of another embodiment of the impact mill.
Figure 10A:
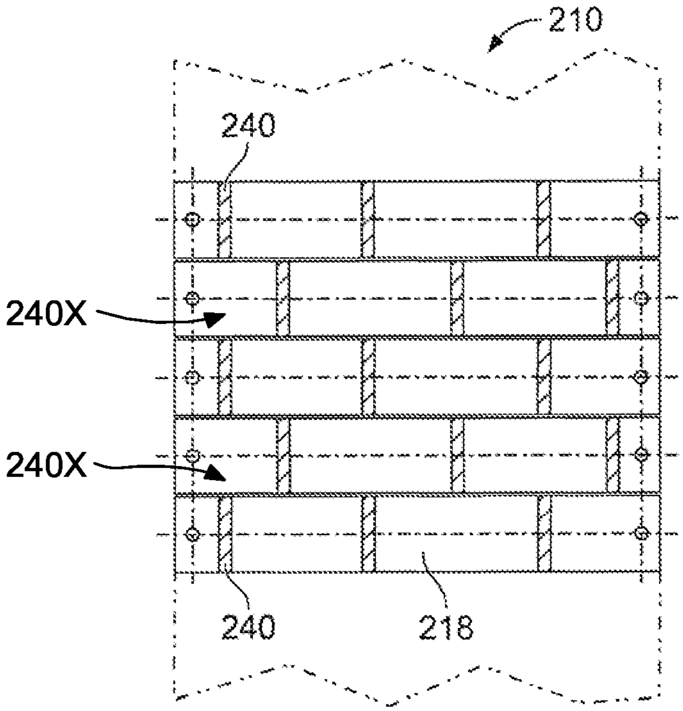
FIG. 10A is an end view of an axial liner used with the embodiment of FIG. 10.
Figure 10B:
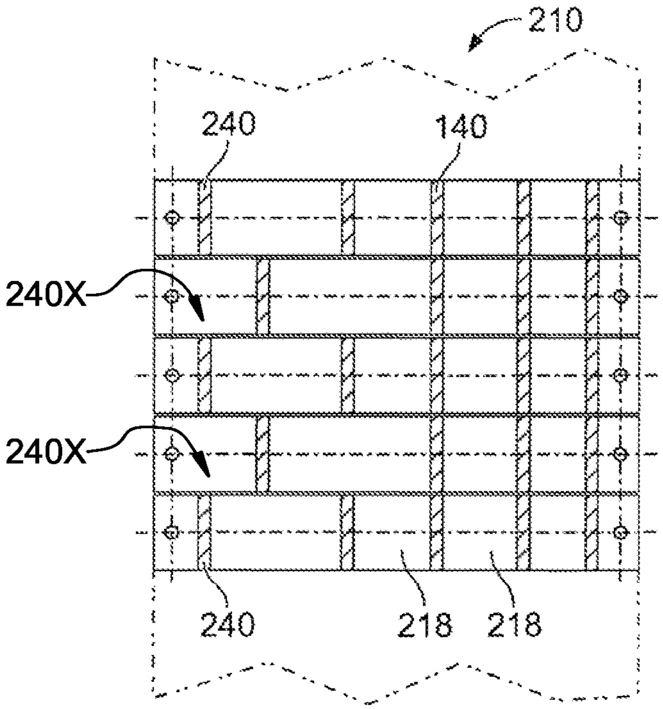
FIG. 10B is an alternative axial view of the liner used with the embodiment of FIG. 10.

Referring now to FIGS. 10, 10A and 10B, another embodiment of the liner 218 and annular baffles 240 for an imp mill 210 is shown. In these embodiments, it will be seen that the annular baffles 240 are no longer continuous circumferentially but instead are segmented along the circumference of the liner 218 to provide segmented sections 240. There is an opening 240X located between adjacent segmented sections 240. It will be understood by persons having ordinary skill in the art that such liners can be created by cutting a standard baffle into segments or by casting, or otherwise forming, the baffles 240 in the shape shown. It will also be understood that while an example of a segmented baffle is shown, the baffles 240 can be cut to leave or take as much material as desired to achieve a desired result and that the number of segments can be changed as needed for better results; the illustrated baffles are shown as exemplary and are not meant to be limiting. Hammers 230 shown in FIG. 10, will be understood to be in offset relationship, such that, for clarity, hammer 230*a* is spaced to pass behind baffle segment 240*a* and hammer 230*b* is spaced to pass in front of baffle segment 240*a*.

It will be understood that in general, the function of an imp mill 210 made in accordance with the present embodiment will function substantially as the rest of the mills disclosed in the present invention, but will add the additional benefit of providing a shearing, or scissoring, action when a hammer 230 passes adjacent to a baffle segment 240 and will tend to then more effectively cut larger pieces of matter, tending to shorten the amount of processing needed by the material to achieve the desired particle size. Additionally, the segmented baffles 240 will allow a greater flow of air between baffles which can cause material to be thrown into the path of the hammers more often. As baffles 240*a* comprise less material than a full baffle, it will be understood that such baffles will have less weight and be more efficiently run within the mill.

It will be understood, as shown in FIG. 10B, that by using a combination of full baffles 140 (FIG. 9) and segmented baffles 240 within the same mill 210 will allow more control of size of particles coming from the mill and the effectiveness and economy of the mill. As an example, a mill 210 can be created with a first and second row of segmented baffles 240*a* and then have full baffles for the remainder thereof; thereby providing the desirable sheering action and air flow of the segmented baffles and the more complete particle moving effect of the full baffles once the material is cut to a more manageable particle size. Persons having ordinary skill in the art will see that there are many combinations of such baffles that can be made without departing from the novel scope of the present invention, including but not limited to alternating segmented and full baffles, ending the flow of material with segmented baffles with either a starting rows of segmented or full baffles, alternating rows thereof, or alternating with the number of hammers varying within the baffle rows.

In summary, then, the present invention provides a means to retain particles of material in the range of the hammer, utilizing the natural flow of air through the mill to allow for more hammer hits per particle of material. This insures that a cycle through an imp mill would include several strikes to larger particles and thereby require fewer cycles to process; ideally the mill can be adjusted, by numbers of hammer, baffles and variation in the speed of the motor, so that one pass is sufficient to process the material. Therefore, if the proper process of maintaining particles in the range of hammers is created, manipulation of the airflow and speed of rotation of hammers would allow users to run such a mill to substantially break down an entire batch of material in a single cycle. Means to keep particles in the range of the hammers with a lessening of the speed of air flow and an increase in the rotation of the hammers, would in some instances, provide the requirements for biomass materials to be broken down to the desired sizes more efficiently and with less cycles of imp mill use. An imp mill running fewer cycles would results in lower labor, and maintenance costs, as well as lower unit energy consumption; a more efficient imp mill would be smaller in size, require no external classifier and therefore be more efficient, more space saving and lower costs of operation and energy use.

While the invention has been described with reference to various exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. An apparatus for pulverizing material, the apparatus comprising:

a housing defining an interior wall of a grinding chamber;

an inlet conduit positioned at an axial input end of the grinding chamber and configured to feed the material vertically downward into the grinding chamber;

an outlet conduit positioned at an axial output end of the grinding chamber and configured to direct the pulverized material vertically upward from the grinding chamber;

a shaft axially traversing at least a part of the grinding chamber;

an axial flow path extending between the inlet conduit and the outlet conduit, parallel to the shaft;

hammers extending radially outwardly from the shaft, the hammers being circumferentially spaced and respectively having attachment ends and heads, the hammers being in pivotal relation to the shaft about a pivot pin and are movable on impact with the material; and annular baffles located axially along the flow path, at least a portion of the annular baffles located above and eclipsing a width of the shaft, each of the annular baffles having an outer circumference and an inner circumference and being attached along the outer circumference to the interior wall of the housing such that the annular baffles are coaxial with the shaft and the inner circumference extends into the grinding chamber adjacent the heads of the hammers, the annular baffles extending continuously along an entirety of the interior wall perpendicular to a direction of flow of air and material parallel to the shaft to promote residence time of the material in proximity to the hammers as air and the material flows through the mill parallel to the shaft, wherein the hammers pivotal relation to the shaft comprises a swinging movement about the pivot pin, in a circumferential direction during operation of the mill;

wherein each of the hammers has a radially outward facing outermost extent and each of the annular baffles has a radially inward facing innermost extent, the radially outermost extent of at least one of the hammers extends radially outward beyond the radially innermost extent of at least one of the annular baffles, by a radial distance; and comprising a variable speed motor configured to rotate the hammers within the grinding chamber, wherein varying the speed of the motor, in conjunction with the baffles, affects residence time and magnitude of impact grinding force acting on particles of the material.

2. The apparatus of claim 1, wherein the hammer and an adjacent baffle are configured to provide a shearing action when the hammer passes the adjacent baffle.

3. The apparatus of claim 1, wherein a number of the annular baffles is at least as many as a number of rows of the hammers, and the hammers and the baffles are interspaced with each other and circumferentially spaced relative to the shaft.

4. The apparatus of claim 1, wherein the grinding chamber is cylindrical in a direction of flow of the material.

5. The apparatus of claim 1, wherein each of the annular baffles is welded to the interior wall of the grinding chamber.

6. The apparatus of claim 1, wherein the annular baffles and the grinding chamber are formed together during casting.

7. The apparatus of claim 1, wherein each of the annular baffles is mechanically fastened to the interior wall of the grinding chamber.

8. The apparatus of claim 7, wherein the annular baffles are constructed in component sections each attached to a corresponding segment of an axial liner that can be fastened to and subsequently removed from the interior wall of the grinding chamber without removing the hammers and the shaft.

9. The apparatus of claim 7, wherein the annular baffles are constructed in component sections each attached to a corresponding segment of an axial liner that can be fastened to and subsequently removed from the interior wall of the grinding chamber without removing the hammers and the shaft and in which each of the component sections is integrally cast with the corresponding liner segment using a wear resistant material.

10. A method of retrofitting the apparatus for grinding material, to improve grinding of material, comprising:

providing the impact mill of claim 1, wherein the annular baffles are installed on a retrofit basis, wherein the retrofitting basis includes the steps of providing the grinding chamber and attaching the annular baffles to the liner.

11. The method of claim 10, wherein the annular baffles are constructed in component sections each attached to a corresponding segment of an axial liner that can be fastened to and subsequently removed from the interior wall of the grinding chamber without removing the hammers and the shaft.

12. The method of claim 10, wherein the annular baffles are constructed in component sections each attached to a corresponding segment of an axial liner that can be fastened to and subsequently removed from the interior wall of the grinding chamber without removing the hammers and the shaft and in which each component section is integrally cast with the corresponding liner segment using a wear resistant material.

13. The apparatus of claim 1, wherein the annular baffles are installed on a retrofit basis which comprises attaching the annular baffles to the liner.

14. The apparatus of claim 1, wherein the annular baffles are retrofitted onto the apparatus by attaching the annular baffles to the liner.

* * * * *